US007465921B1

(12) United States Patent
Joyce et al.

(10) Patent No.: US 7,465,921 B1
(45) Date of Patent: *Dec. 16, 2008

(54) STRUCTURED CARBON NANOTUBE TRAY FOR MALDI PLATES

(75) Inventors: Timothy H. Joyce, Mountain View, CA (US); Dan-Hul Dorothy Young, Sunnyvale, CA (US); Jennifer Lu, Milpitas, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 11/367,735

(22) Filed: Mar. 2, 2006

(51) Int. Cl.
*H01J 49/16* (2006.01)
*H01J 49/00* (2006.01)
*B01D 59/44* (2006.01)

(52) U.S. Cl. ....................... 250/288; 250/281; 250/282; 250/423 R; 438/535

(58) Field of Classification Search ................. 250/288, 250/281, 282, 423 R; 438/535
See application file for complete search history.

(56) References Cited

U.S. PATENT DOCUMENTS

| | | | | |
|---|---|---|---|---|
| 6,952,011 | B2 | 10/2005 | Brown et al. | |
| 7,034,290 | B2 * | 4/2006 | Lu et al. | 250/288 |
| 7,078,683 | B2 * | 7/2006 | Joyce | 250/288 |
| 7,256,394 | B2 * | 8/2007 | Yang et al. | 250/288 |
| 2003/0012723 | A1 | 1/2003 | Clarke | |
| 2005/0260453 | A1 | 11/2005 | Jiao et al. | |
| 2005/0269726 | A1 | 12/2005 | Matabayas et al. | |
| 2005/0272342 | A1 | 12/2005 | Chen et al. | |
| 2005/0277201 | A1 | 12/2005 | Sivarajan et al. | |
| 2006/0013756 | A1 | 1/2006 | Siochi et al. | |
| 2006/0097150 | A1 * | 5/2006 | Joyce et al. | 250/288 |

OTHER PUBLICATIONS

Dissertation, "Nanomechanics and the Visoelastic Behavior of Carbon Nanotube-Reinforced Polymers", Chapter 5, Frank Thomas fishcer, Northwestern University (Dec. 2002).

* cited by examiner

*Primary Examiner*—Nikita Wells

(57) ABSTRACT

An apparatus for producing analyte ions for detection by a mass spectrometer is described. The apparatus includes an ion source in which the surface of a target substrate for holding an analyte sample includes structured carbon nanotube material. The structured carbon nanotube material is structured in terms of being situated on a selected portion of the target support surface an/or in terms of being aligned in a selected orientation.

26 Claims, 7 Drawing Sheets

STRUCTURED CARBON NANOTUBE TRAY FOR MALDI PLATES

BACKGROUND INFORMATION

In the preparation of samples for MALDI ionization, an analyte sample is typically intercalated in a matrix material on the surface of a support plate. A laser is then directed onto the targeted sample on the support plate in order to desorb energized matrix and analyte particles, which then causes ionization of the analytes through electron transfer reactions.

Carbon nanotubes have recently been used as a surface coating on MALDI sample target plates due to their exceptional physical and chemical properties, such as their hydrophobicity and their capacity to absorb ultraviolet radiation, which is the typical range of wavelengths used for the laser in the MALDI method. The carbon nanotubes are currently deposited over the target sample plate by chemical vapor deposition (CVD), which leaves a thin film of randomly ordered single or multi-walled carbon nanotubes that covers the entire exposed surface of the target plate. While the carbon nanotubes may be a useful material even in this spatially non-specific and relatively disordered state, it is believed that some of the beneficial properties of the carbon nanotubes are not necessarily being taken full advantage of in the MALDI process when used in this way.

SUMMARY OF THE INVENTION

The present invention provides a target support having a surface that includes structured nanotubes for holding a MALDI sample. The nanotubes may be structured spatially such that the nanotubes occupy a selected portion of the target support surface, and/or the nanotubes may be structured in terms of their alignment and orientation.

In a first aspect, the present invention provides a mass spectrometer system that comprises an ion source for generating ions from a sample, a target support situated in the ion source having a surface for holding the sample, the surface including a structured carbon nanotube material, a laser for ionizing the sample on the structured carbon nanotube surface, and a detector situated downstream for the ion source for detecting the analyte ions.

In a second aspect, the present invention provides an ion source for use in ionizing a sample that comprises an irradiating source for ionizating the sample to form analyte ions, and a target support having a surface for holding the sample, the surface including a structured carbon nanotube material.

In yet another aspect, the present invention provides a method of producing a target support having a surface including structured carbon nanotubes for holding a sample in an ionization source, the method comprising coating catalyst material over the surface of the target support, depositing carbon material over the catalyst material, removing catalyst material except over a selected portion of surface of the target support, growing carbon nanotubes from the carbon material over the selected portion including the catalyst material, and placing the sample on the carbon nanotubes.

In one implementation of the exemplary method of the present invention, the carbon nanotubes are grown such that they are aligned substantially either perpendicular or parallel to the surface of the target support.

DETAILED DESCRIPTION

In describing and claiming the present invention, the following terminology will be used in accordance with the definitions set out below.

The singular forms "a," "an," and "the" include plural referents unless the context clearly dictates otherwise. Thus, for example, reference to "a portion of the surface of a target support" encompasses more than one portion of a surface of a target support.

The term "adjacent" means near, next to or adjoining. Something adjacent may also be in contact with another component, be spaced from the other component or contain a portion of the other component. For instance, a carbon nanotube that is adjacent to a surface or plate may be next to the surface, on the surface or plate, embedded in the surface or plate, fixed to the surface or plate, contact the surface or plate, surround the surface or plate, and/or comprise a portion of the surface or plate.

The term "ion source" or "source" refers to any source that produces analyte ions. Ion sources may comprise other sources besides AP-MALDI ion sources such as electron impact (EI), chemical ionization (CI) and other sources known in the art.

The term "structured" refers to a spatial positioning and/or alignment that is not random.

Figure 1:
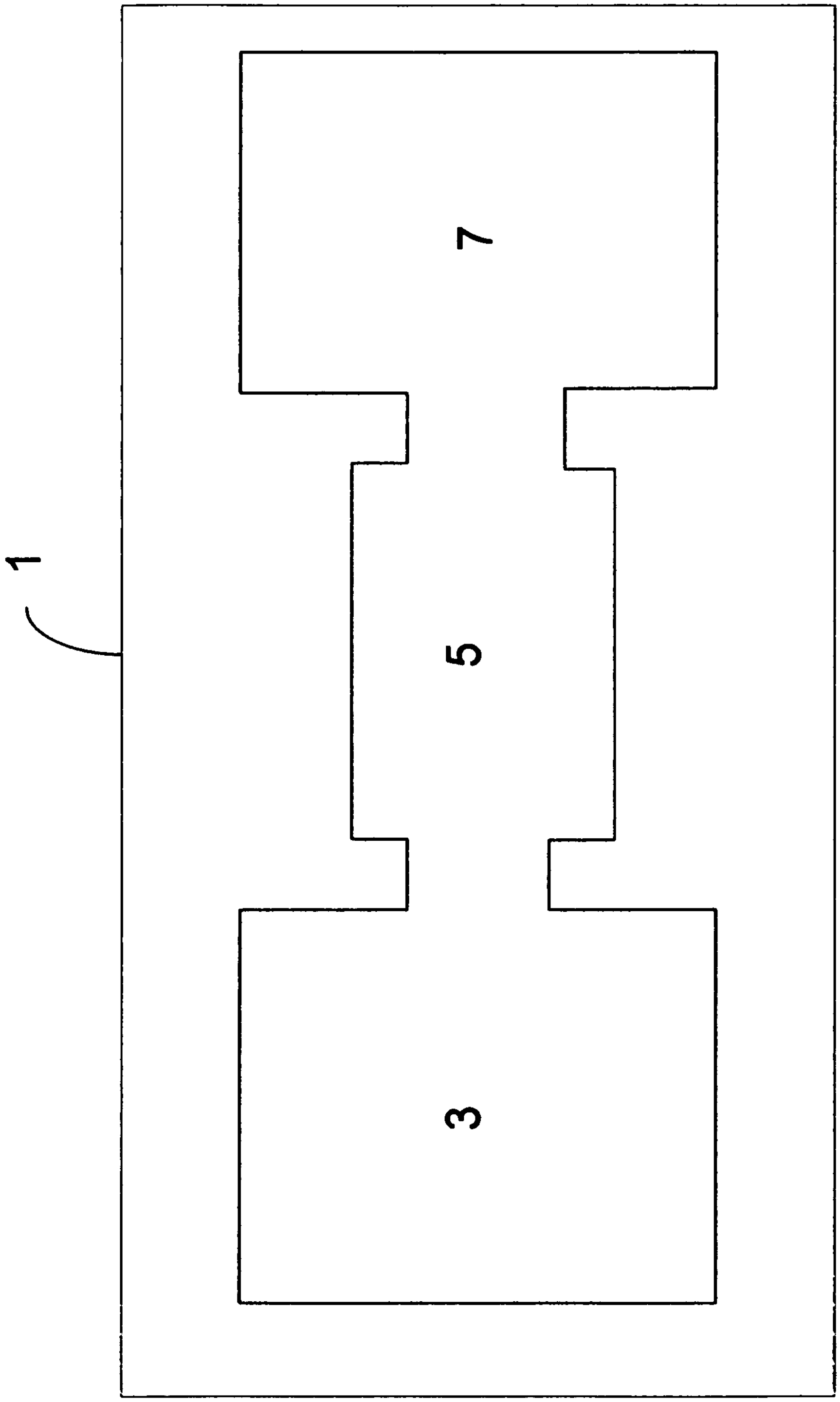
FIG. 1 shows a general schematic diagram of a mass spectrometer system.

FIG. 1 shows a block diagram of a mass spectrometry system. The block diagram is not to scale and is drawn in a general format because the present invention may be employed with a variety of different types of mass spectrometers. The mass spectrometry system 1 comprises an ion source 3, an ion transport system 5, and a detector 7.

The ion source 3 may comprise a variety of different types of ionization mechanisms known in the art. For example, the ion source 3 may comprise a matrix-assisted laser desorption ionization source (MALDI) at either atmospheric (AP-MALDI) or non-atmospheric pressure. Other potential sources include electron ionization (EI), chemical ionization (CI), atmospheric pressure ionization (APPI), atmospheric pressure chemical ionization (APCI) and combinations of these devices. In general, the present invention may be applied to any ion sources which comprise a laser for the production of an ion plume, or perform a particular surface ionization or production of ion plume from a surface.

The transport system 5 is situated downstream and adjacent to the ion source for receiving analyte ions therefrom, and may comprise a variety of ion optics, conduits and other devices known in the art that are used to guide ions. These devices may or may not be under vacuum.

The ion detector 7 is situated downstream from the transport system and may comprise a mass filter for selecting ions according to their mass to charge ratio, and a device, such as a charge-coupled device (CCD) that detects the impact of analyte ions, and can therefore provide information as to their abundance.

Figure 2:
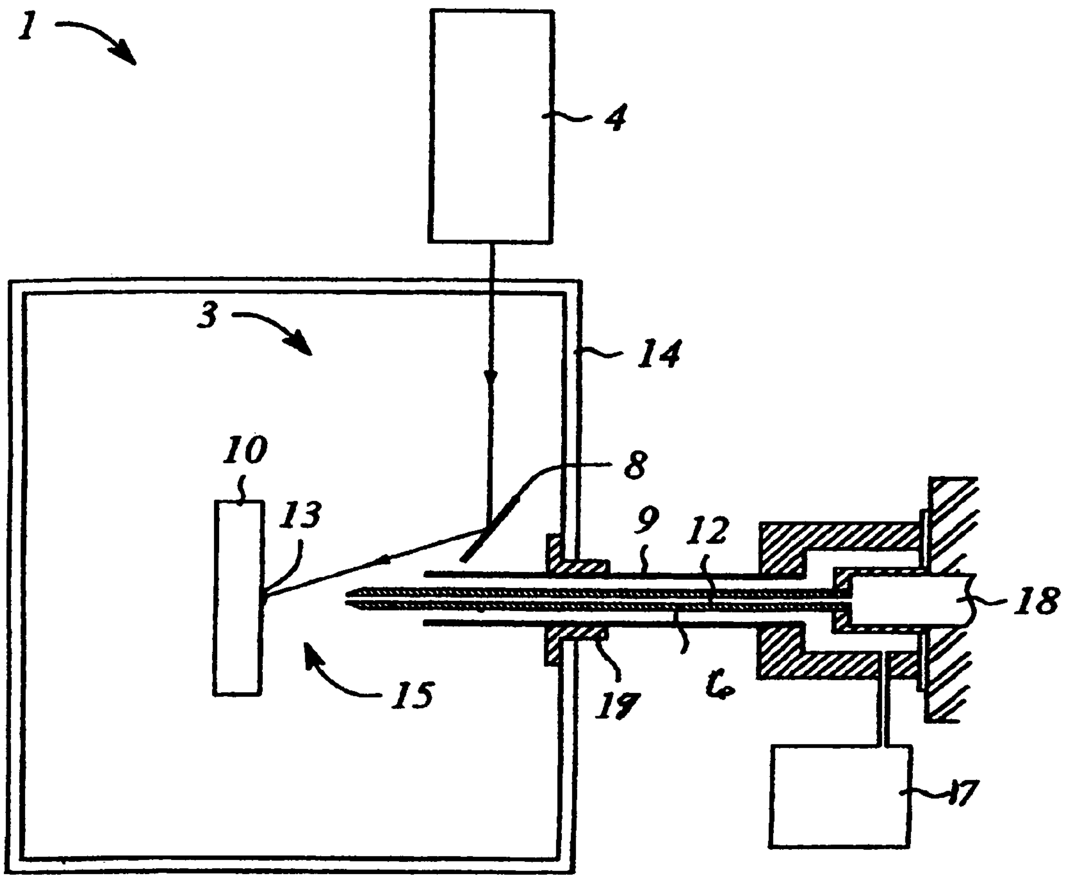
FIG. 2 shows a MALDI ion source according to an embodiment of the present invention.

FIG. 2 shows a cross-sectional view of a MALDI ion source according to the present invention. The ion source 3 includes a housing 14 that encloses the source, but which is optional, as the source does not need to be completely enclosed. The ion source 3 includes a laser source 4, and a target support 10. A target 13, which may comprise an analyte sample, is applied to the surface of the target support 10. The target 13 may also include matrix material, but this is not necessary in all instances. The laser source 4 provides a laser beam that is directed by a control system (not shown) toward the target 13. An optional reflector 8 may also be employed. The target 13 is desorbed and ionized by the laser beam and the analyte ions are released in an ion 'plume' into an ionization region 15.

The ionization region 15 is located between the ion source 3 and a capillary 6 that leads into the transport region 5. Analyte ions that enter the ionization region 15 may be guided towards the capillary by a gas dynamics provided by a gas source 7 through a conduit 9.

The target support 10 is designed to hold and maintain a target 13. The surface of the target support 10 is coated with carbon nanotubes structured according to the present invention. The surface of the target support 10 may be entirely covered with the target 13, or, more typically, the target 13 may be placed on a portion of surface of the target support.

Carbon nanotubes are graphene cylinders that have high chemical resistance and mechanical strength. In addition, carbon nanotubes in their natural state are extremely hydrophobic, i.e., they do not form hydrogen bonds with water molecules and thus combine with other hydrophobic materials in aqueous solution due to surface tension. Coating or modifying the surface of the target support 10 with nanotubes provides an extremely large surface area with good binding or attachment sites for analyte and/or matrix materials, particularly if they are hydrophobic or have hydrophobic side portions such as side chains. This property of nanotubes, along with its exceptional UV absorbtivity, promotes ionization and production of an ion plume in the MALDI process.

Both single-walled nanotubes (SWNTs) and multiple-walled nanotubes (MWNTs) can be synthesized and grown by various techniques known in the art. Typically, carbon nanotubes are grown on a "seed" layer of metal catalyst deposited on a substrate and then carbon is deposited over the catalyst using chemical vapor deposition (CVD) of a hydrocarbon gas. To create nanotube structures with specific locations on the target support, the positioning of the catalysts on the support is precisely controlled.

Figure 3A:
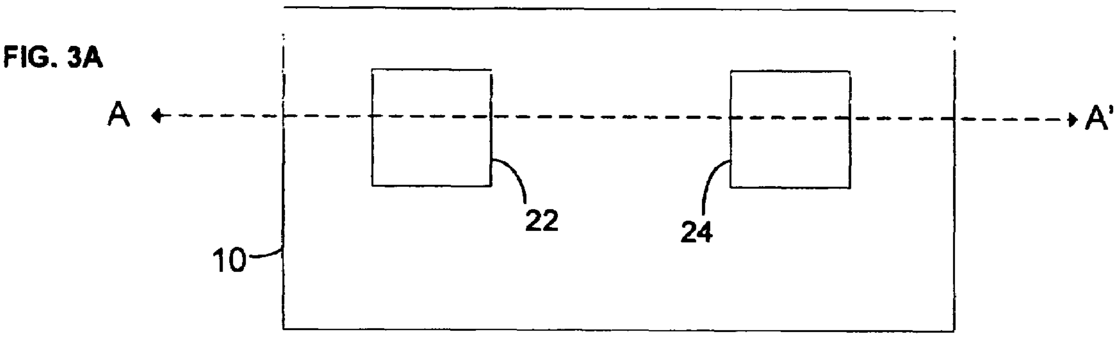
FIGS. 3A, 3C, 3E and 3G show top views of successive stages of an exemplary method for fabricating structured nanotube-bearing target supports according to the present invention.

FIGS. 3A through 3H illustrate a method for structuring growth of nanotubes on a target support, with FIGS. 3A, 3C, 3E and 3G showing top views and FIGS. 3B, 3D, 3F and 3H showing corresponding cross-sectional views along line A-A' of FIG. 3A, respectively.

Figure 3B:
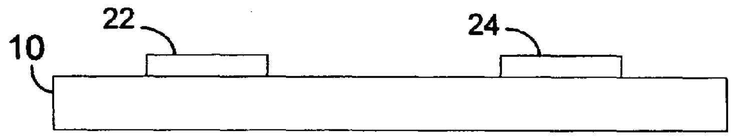
FIGS. 3B, 3D, 3F and 3H show successive cross-sectional views corresponding to the top views shown in FIGS. 3A, 3C, 3E and 3G, respectively.

FIGS. 3A and 3B show an example target support 10 that includes two 'platforms' 22, 24 positioned on portions of the surface of the target support on which nanotube growth is desired. It is noted that both the number of platforms and their size and shape are completely exemplary, and the number, size, and shape can be chosen based on where it is desired for samples to be ultimately located on the target support during the ionization process. Thus, the positioning of the platforms may be done in various surface (X, Y) coordinates on the target support to accommodate a variety of existing instrument setups and designs.

Platforms 22, 24 may be deposited, positioned or layered on the surface of the target support in any number of ways as commonly known in the art. The platforms 22, 24 may comprise a material that is generally resistant to certain chemical and heat treatments that are applied in subsequent steps as discussed below, such as silicon, silicon nitride, glass, quartz, mica and combinations thereof. The material of the platforms 22, 24 may also be functionalized with hydrophobic or hydrophilic compounds to promote binding.

Figure 3C:
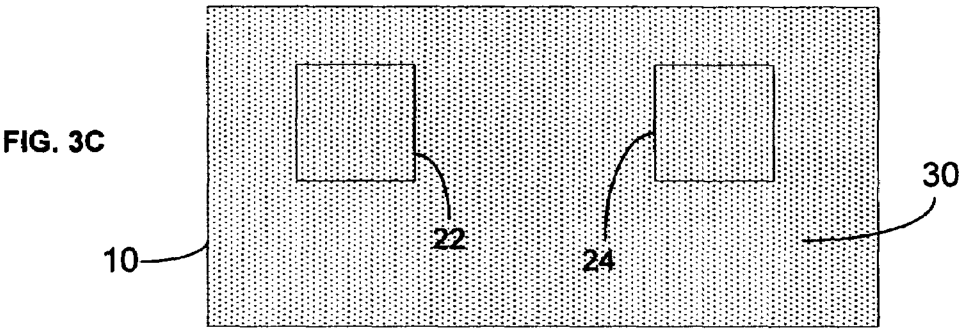
Figure 3D:
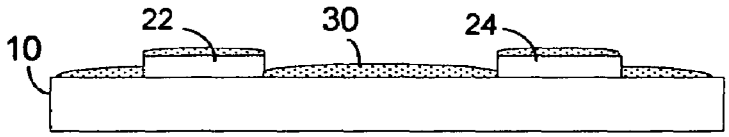

A catalytic material layer 30 is then deposited over the surface of the target support 10, including the platforms 22, 24. The catalyst may include a variety of metals, such as Pt, Au, Al, Fe, Ni, Co, W, Ti, Ta, Cu and combinations thereof. The catalyst may be dispersed over the target support 10 in a number of ways. For example, the catalyst may be mixed with a polymeric binding material, such as polyvinylpyradine (PVP), and then spin-coated over the target support surface. This coating may then be annealed at a low temperature to adhere to the target support 10. In an alternative catalyst deposition process, an ion or electron beam incident upon a gaseous precursor, such as an organometallic compound, causes a catalyst film layer 30 to be deposited substantially uniformly over the surface of the target support 10. $C_7H_7F_6O_2Au$ and $C_9H_{16}Pt$ are examples of organometallic compounds which may be used in this context. FIGS. 3C and 3D show the target support 10 and platforms 22, 24 coated with the catalyst layer 30.

Figure 3E:
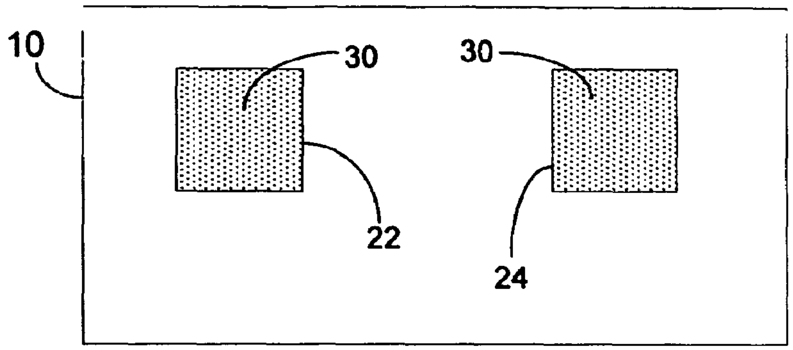
Figure 3F:
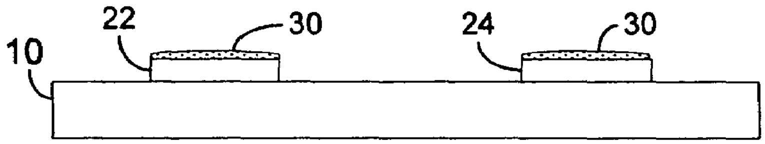
Figure 3G:
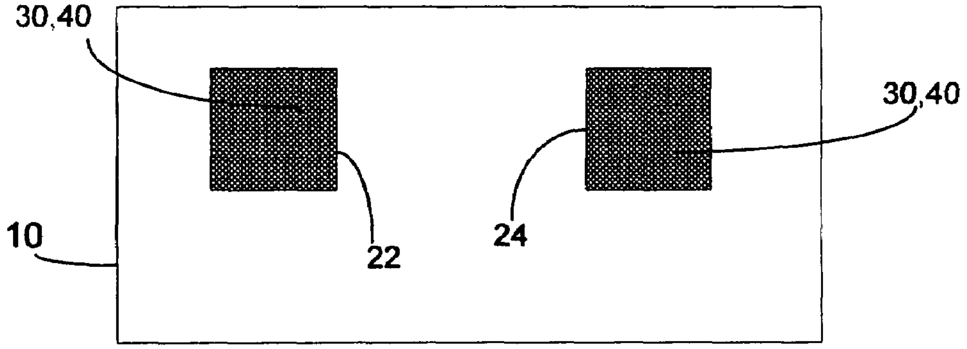
Figure 3H:
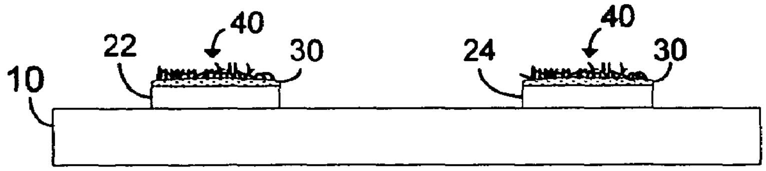

After the catalyst has been deposited over the target support surface, all of the catalyst directly contacting the target support surface is removed, while the catalyst adhered onto the platform surfaces remain. This may be accomplished by use of chemical etchants, high temperature sintering, or by patterning via lithography or ion beam. Since the platform surface may be functionalized, the binding between the catalyst layer and the platforms is stronger than the level of binding between the catalyst and the target support, so that the catalyst layer on the platforms is not degraded by the chemical and temperature treatments. FIGS. 3E and 3F show the target support structure at this stage. As can be discerned, a catalyst layer remains only in the prescribed areas represented by platforms 22, 24, in which nanotube growth is desired. Carbon material is then deposited onto the target support 10, and nanotube growth occurs on the catalyst layers over the platforms 22, 24, yielding the structured nanotube target support shown in FIGS. 3G and 3H.

Nanotube growth (synthesis) conditions, in terms of temperature and chemical environment, can be adjusted so that mostly single-walled, or alternatively mostly multiple-walled nanotubes are produced. In particular, prevailing synthesis conditions affect the diameter of the nanotubes produced. For example, it has been found that a high hydrogen concentration during synthesis tends to result in smaller nanotube diameter sizes.

In one embodiment, the platforms are fabricated on the nanometer scale and have surfaces with dimensions on this scale. If such platforms are spotted on the surface of the surface of the target support in an array and a nickel catalyst layer is deposited onto the platform spots, it has been shown that single-walled carbon nanotubes can grow in an aligned manner from such spots. However, if the area of the catalyst upon which the nanotubes grow is large in comparison to the diameter of the nanotubes (as will be the case in many applications), the nanotubes will not all necessarily be initially aligned with respect to the surface or one another, either perpendicular to the platform (and target support) surface, or parallel to the platform surface. To create a structure array of nanotubes on a surface having a substantially uniform alignment in this case, the nanotubes can be aligned by growing the nanotubes in a template element, or by applying other alignment techniques.

Figure 4:
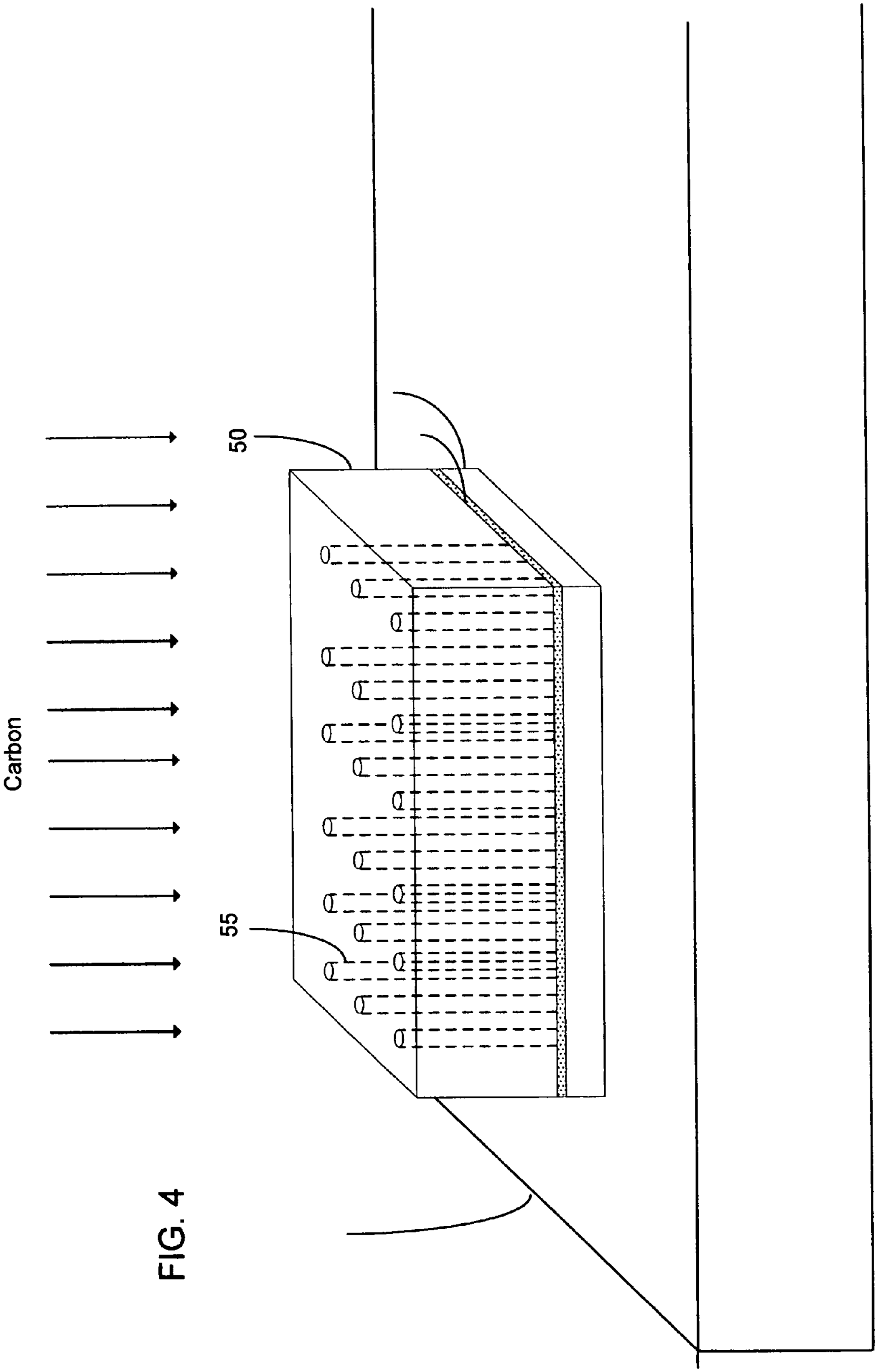
FIG. 4 shows an exemplary template used for aligning nanotubes according to an embodiment of the present invention.

In one embodiment, in which a perpendicular alignment is desired, a metallic template 50 having numerous cylindrical channels 55 dimensioned on the nanometer scale is positioned over the catalyst layer on the platforms of the target substrate. The channels are aligned upright, perpendicular to the surface of the platform and target support. An example of such a template 50 is shown in FIG. 4. A template of this type may comprise a metal and can be fabricated using an anodization process described, for example, in Masuda, H. et al., "Highly ordered nanochannel-array architecture in anodic alumina," *Applied Physics Letters*, v. 71(19) (1997). Once the template 50 is positioned, carbon material is deposited by chemical vapor deposition (CVD), filling the channels 55 of the template with carbon. Due to the extremely narrow dimensions of the channels 55, the growth of the carbon nanotubes is constrained along their length, resulting in an array of aligned nanotubes over each of the platforms on the target support.

Figure 5:
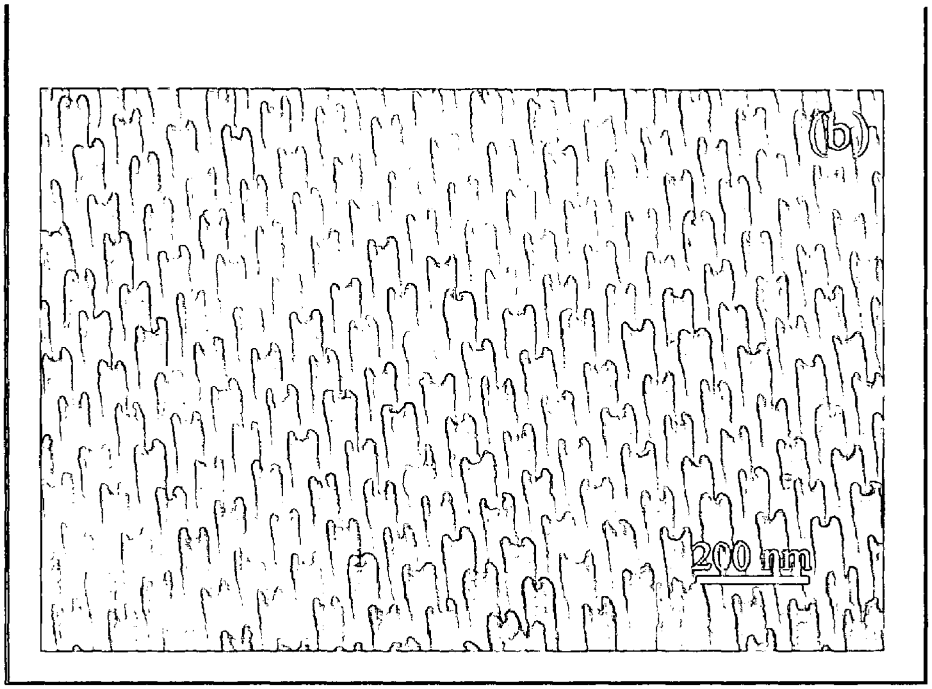
FIG. 5 shows an exemplary aligned nanotube array.
Figure 6:
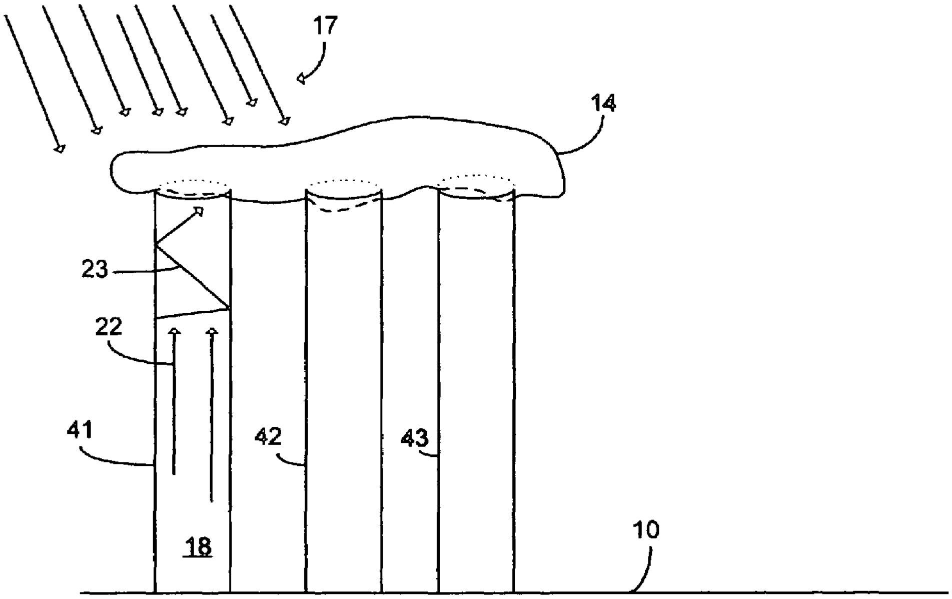
FIG. 6 is a magnified view showing sample material situated on aligned carbon nanotubes in a target support according to an embodiment of the present invention.

Once the nanotubes have been synthesized within the channels of the template, etching procedures can be employed to dissolve or otherwise remove the template leaving aligned, free-standing nanotubes covering the surface of the platforms. Such a nanotube array, an example of which is shown in FIG. 5, is useful as a support for analyte samples in the MALDI context. FIG. 6 shows a section of a structured nanotube support 10 containing sample material 14. As shown the sample rests on top of aligned nanotubes 41, 42, 43. Since the nanotubes are hollow, the sample 14 onto contacts the nanotubes on their top rims, so that there is much less contact area than would be the case if the samples contacted a flat surface. Due to this reduced area of contact, there is less hydrogen bonding and surface tension between the sample 14 and the overall support structure, and less energy needs to be spent in desorbing the sample 14 from the support structure, promoting ionization efficiency.

Another advantage of using carbon nanotubes, particularly in the upright configuration, is that portions of the laser radiation incident on the sample which would otherwise be absorbed can be reflected back onto the sample for desorption and ionization because the tubes are hollow. As shown in FIG. 6, incident radiation 17 is directed onto the sample from a laser beam. As depicted, some of this radiation is reflected from the base platform 22 back toward the sample 14 through the hollow region 18 of the tube 41, and some (probably a smaller portion) reflects off the walls of the nanotube also back toward the sample. In this manner, more of the total incident radiation impacts the sample material. The advantages of the structured carbon nanotube support can make matrix-less applications feasible, in which samples are prepared by placing an analyte solution, without matrix material, directly onto the carbon nanotubes.

Figure 7A:
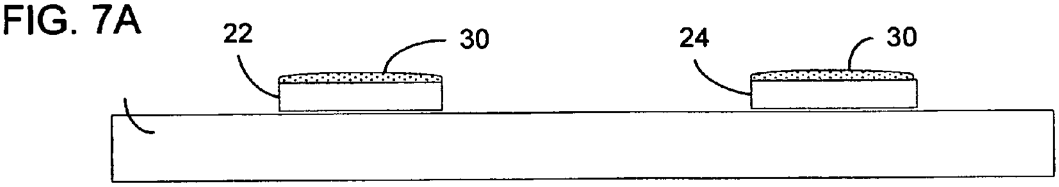
FIGS. 7A, 7B and 7C show successive stages of an exemplary method for fabricating horizontally aligned nanotubes on target supports according to the present invention.
Figure 7B:
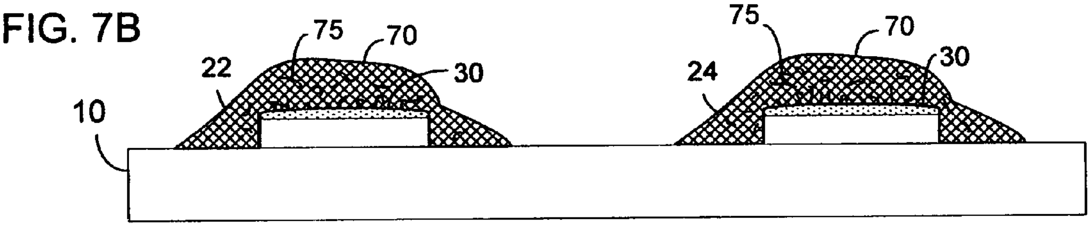
Figure 7C:
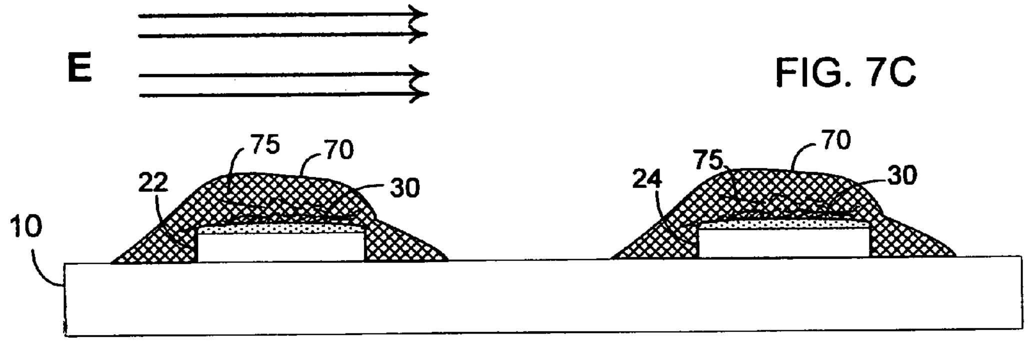

FIGS. 7A-C illustrate an alternative method for aligning carbon nanotubes on a target support, which has the advantage that it can be used to align the nanotubes in any selected orientation. In a first stage shown in FIG. 7A, a catalyst layer 30 has been deposited on platforms 22, 24 and extraneous catalyst material has been removed, similar to the stage shown in FIG. 3F. Carbon nanotubes are mixed with a liquid crystal resin and possibly a polymeric matrix material and then coated onto the surface of the target support by spin-casting. FIG. 7B shows the nanotube-liquid crystal resin 70 deposited over the catalyst layer 30. The nanotubes within this layer are relatively disordered at this stage within the matrix and resin and some are suspended within the resin. As shown in FIG. 7C, the support structure is then subjected to an electric field which causes alignable crystal structures within the liquid crystal resin to align with the electric field, which in this case is horizontal in orientation. As these structures align, mechanical forces are brought to bear that cause the nanotubes to align in the same direction. Since the nanotubes are more likely to grow near the catalyst layer, a high concentration of nanotubes will grow in contact with the catalyst and in the orientation of the electric field. FIG. 7C shows the nanotubes in the process of aligning themselves horizontally. A horizontal nanotube alignment allows the large surface area contained in the side-walls of the nanotubes to be used as binding sites. The side-walls of the nanotubes can be functionalized with either compounds that are part hydrophobic and part hydrophilic. The hydrophobic parts of the compounds will bind to the nanotubes allowing the hydrophilic part free to bind to other hydrophilic species. In this manner, hydrophilic compounds can be layered over functionalized horizontally aligned nanotubes. This may be useful for MALDI applications where the sample preparation has hydrophilic properties, for example.

Having described the present invention with regard to specific embodiments, it is to be understood that the description is not meant to be limiting since further modifications and variations may be apparent or may suggest themselves to those skilled in the art. It is intended that the present invention cover all such modifications and variations as fall within the scope of the appended claims.

What is claimed is:

1. A mass spectrometer system comprising:

(a) an ion source for generating ions from a sample;

(b) a target support situated in the ion source having a surface for holding the sample, the surface including a structured carbon nanotube material;

(c) a laser for ionizing the sample on the structured carbon nanotube surface; and (d) a detector situated downstream from the ion source for detecting the analyte ions.

2. The mass spectrometer system of claim 1, wherein the ion source comprises an AP-MALDI ion source.

3. The mass spectrometer system of claim 1, wherein the ion source comprises a MALDI ion source.

4. The mass spectrometer system of claim 1, wherein the carbon nanotube material is situated in a selected portion of the surface of the target support.

5. The mass spectrometer system of claim 4, wherein the carbon nanotube material is aligned substantially perpendicular to the surface of the target support.

6. The mass spectrometer system of claim 4, wherein the carbon nanotube material is aligned substantially parallel to the surface of the target support.

7. The mass spectrometer system of claim 1, further comprising:

catalyst material situated on a selected portion of the target support surface;

wherein the carbon nanotube material is situated on the selected portion containing the catalyst material.

8. The mass spectrometer system of claim 1, wherein the carbon nanotube material is hydrophobic.

9. The mass spectrometer system of claim 1, wherein the carbon nanotube material is functionalized with a compound.

10. The mass spectrometer system of claim 1, wherein the carbon nanotube material is functionalized with a compound that is part hydrophobic and part hydrophilic.

11. The mass spectrometer system of claim 1, wherein the sample includes matrix material.

12. A ion source for use in ionizing a sample, comprising:

(a) an irradiating source for ionizating the sample to form analyte ions; and (b) a target support having a surface for holding the sample, the surface including a structured carbon nanotube material.

13. The ion source of claim 12, further comprising:

catalyst material situated on a selected portion of the target support surface, wherein the carbon nanotube material is coated over the catalyst material.

14. The ion source of claim 12, wherein the irradiating source comprises a laser.

15. The ion source of claim 12, wherein the carbon nanotube material is aligned substantially perpendicular to the surface of the target support.

16. The ion source of claim 12, wherein the carbon nanotube material is aligned substantially parallel to the surface of the target support.

17. A method of producing a target support having a surface including structured carbon nanotubes for holding a sample in an ionization source:

coating catalyst material over the surface of the target support;

removing catalyst material except over a selected portion of surface of the target support;

growing carbon nanotubes selectively on the catalyst material using a carbon source; and placing the sample on the carbon nanotubes.

18. The method of claim 17, wherein the coating of the catalyst material over the surface of the target support is performed by spin casting.

19. The method of claim 17, further comprising:

prior to coating the target support with catalyst material, providing platforms on the selected portion of the target support surface.

20. The method of claim 17, further comprising:

growing the nanotubes in an alignment perpendicular to the target support surface.

21. The method of claim 20, wherein the growing of the nanotubes in a perpendicular alignment includes placing a template having vertical holes over the catalyst material and growing the carbon nanotubes within the vertical holes of the template.

22. The method of claim 17, further comprising:

growing the nanotubes in an alignment parallel to the target support surface.

23. The method of claim 22, wherein the growing of the nanotubes in a parallel alignment includes:

(a) coating the carbon nanotubes on the target support with a material susceptible to alignment via an electric field;

b) subjecting the target support to an electric field; and c) removing the alignable material.

24. The method of claim 23, wherein the alignable material comprises a liquid crystal resin.

25. The method of claim 17, wherein the ionization source comprises a MALDI ion source.

26. The method of claim 17, wherein the carbon source includes an alcohol or carbohydrate.

* * * * *

UNITED STATES PATENT AND TRADEMARK OFFICE

CERTIFICATE OF CORRECTION

PATENT NO. : 7,465,921 B1 
APPLICATION NO. : 11/367735
DATED : December 16, 2008
INVENTOR(S) : Joyce et al.

It is certified that error appears in the above-identified patent and that said Letters Patent is hereby corrected as shown below:

On the Title page, in field (75), in “Inventors”, in column 1, line 2, delete “Dan-Hul Dorothy Young,” and insert -- Dan-Hui Dorothy Yang, --, therefor.

On the Title page, in field (56), under “Other Publications”, in column 2, line 1, delete “Visoelastic” and insert -- Viscoelastic --, therefor.

Signed and Sealed this

Twenty-third Day of June, 2009

JOHN DOLL
*Acting Director of the United States Patent and Trademark Office*